United States Patent [19]

Berry

[11] 4,004,366
[45] Jan. 25, 1977

[54] ADJUSTABLY MOUNTED POWER FISHING REEL

[76] Inventor: Arthur E. Berry, 18645 Cambridge Drive, Lathrup Village, Mich. 48076

[22] Filed: Jan. 8, 1976

[21] Appl. No.: 647,611

[52] U.S. Cl. .............................. 43/27.4; 242/106
[51] Int. Cl.² ....................................... A01K 97/00
[58] Field of Search ............ 43/27.4, 4, 6.5, 43.12; 242/106

[56] References Cited

UNITED STATES PATENTS

| 1,619,512 | 3/1927 | Heckman | 43/27.4 X |
| 3,008,259 | 11/1961 | Zornes | 43/43.12 |
| 3,049,829 | 8/1962 | Clapp | 43/6.5 |
| 3,614,016 | 10/1971 | Rieth | 43/27.4 X |
| 3,719,331 | 3/1973 | Harsch | 43/43.12 X |
| 3,844,058 | 10/1974 | King | 43/27.4 |
| 3,937,415 | 2/1976 | Prinz | 43/27.4 X |

Primary Examiner—Louis G. Mancene
Assistant Examiner—Daniel J. Leach
Attorney, Agent, or Firm—William T. Sevald

[57] ABSTRACT

Power reels are used to lower and raise heavy weights on metal line first to sink the fishing lure line to a depth of 100-300 feet and then to remove the weights and metal line upon a fish taking the lure to avoid fouling entanglement. The reels are mounted on the boat for support and the mountings of the invention pivotally support the reel so that the reel and attached pole can swing vertically on a horizontal axis between inboard and outboard position and can swing horizontally on a vertical axis to set the reel and attached pole portion at the desired angle. The mounting facilitates quick attachment and detachment of the reel and pole portion. The mounting with the reel and pole detached constitutes a cleat or head for securing dock and tow lines.

10 Claims, 13 Drawing Figures

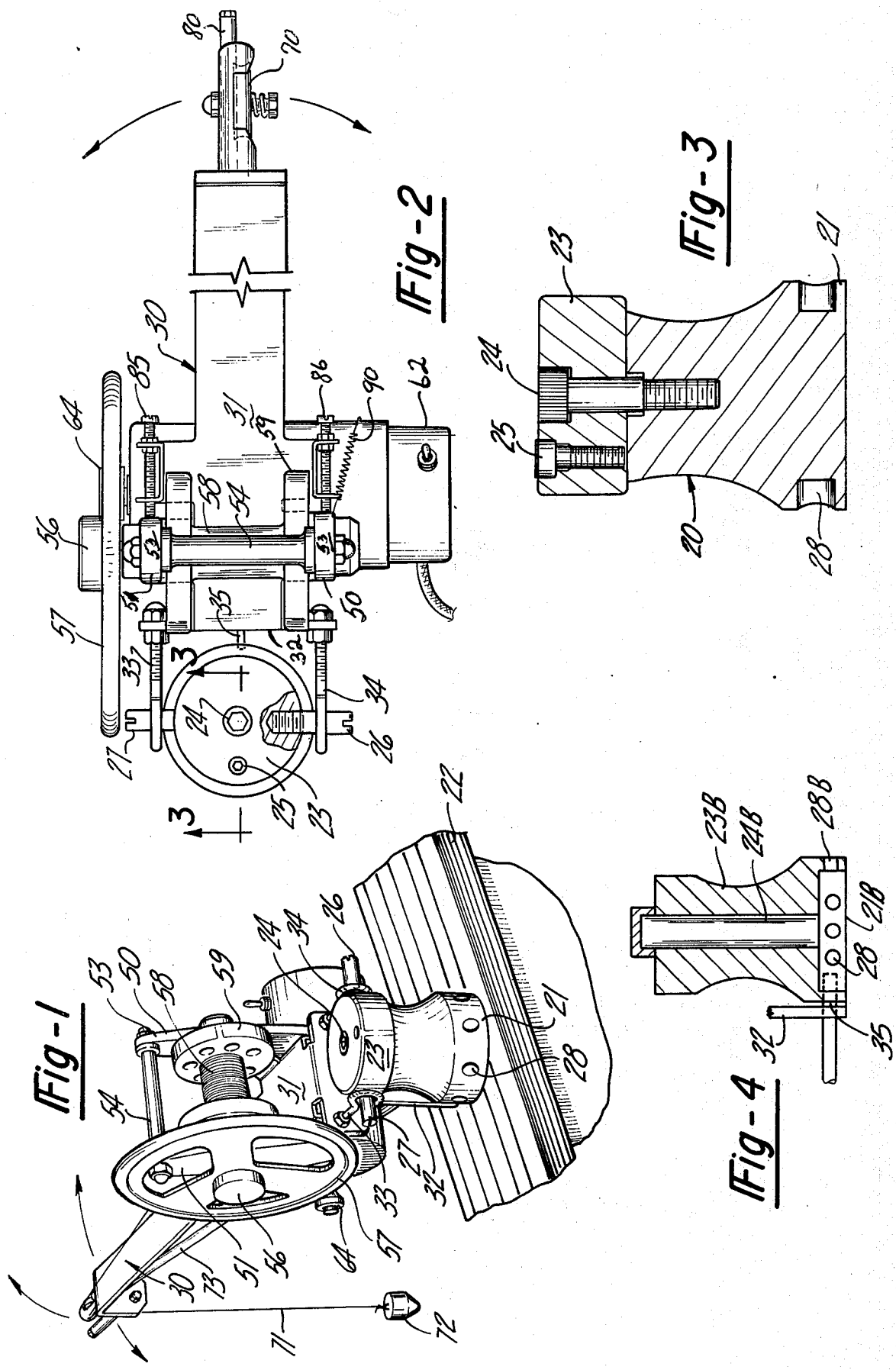

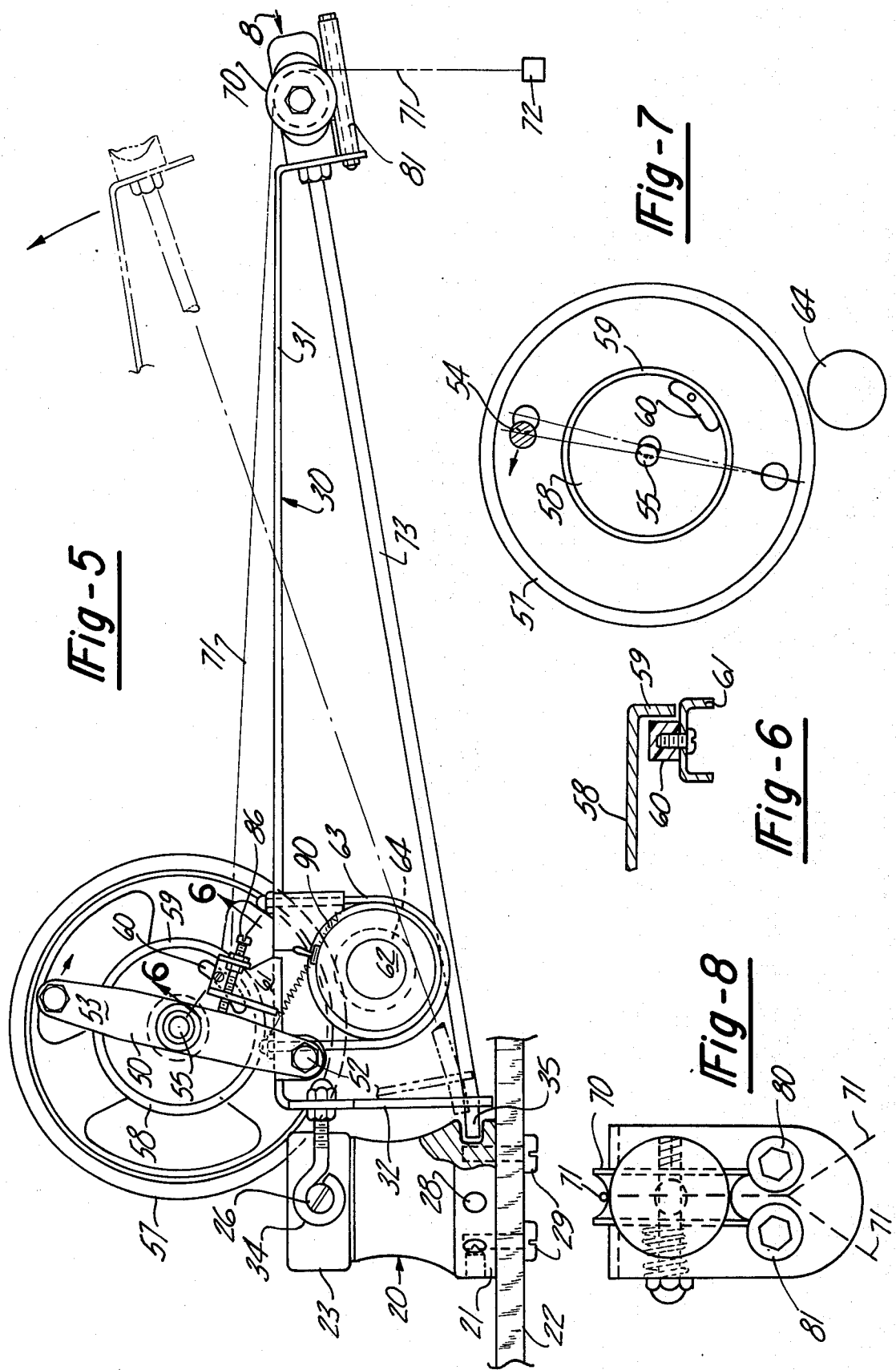

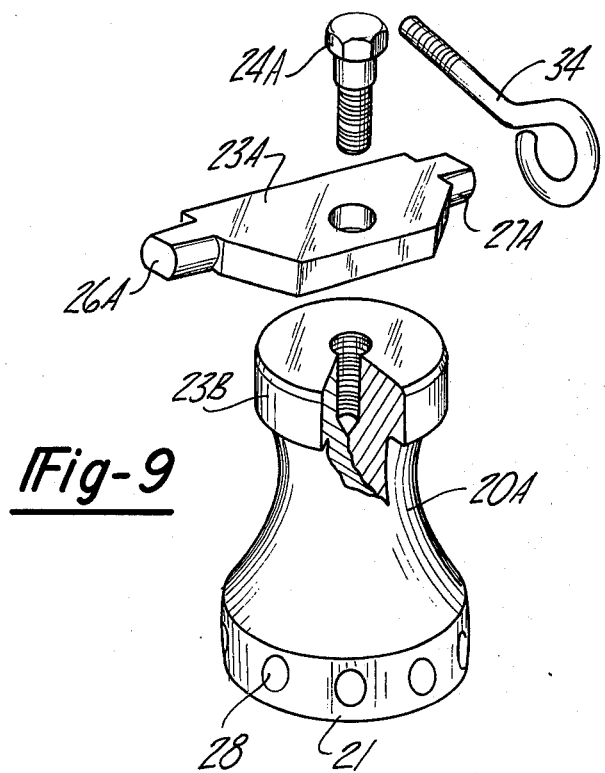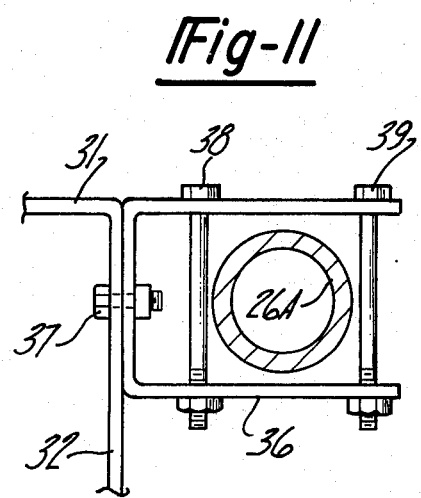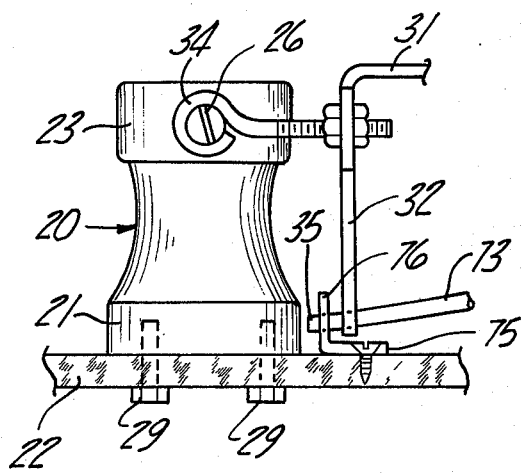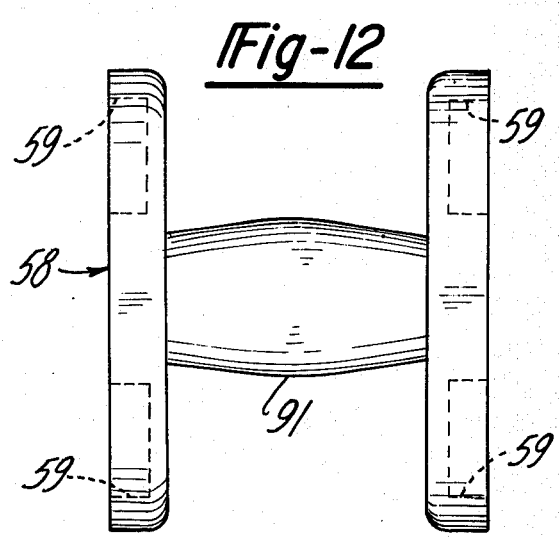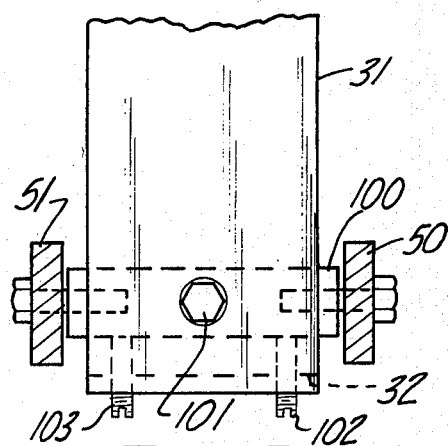

ADJUSTABLY MOUNTED POWER FISHING REEL

BACKGROUND OF THE INVENTION

In deep-water fishing for lake trout, coho salmon, etc., heavy weights on metal line are needed to sink the fishing line and lure to the desired depth of 100–300 feet. When a fish takes the lure, the fishing line detaches from the metal sinker line by means of an automatic release. Thereupon, it is necessary to raise the metal line and weights quickly to prevent fouling entanglement with the fishing line.

Weights of 8, 16 and 24 pounds are used and it has been found that power reels and strong supports are needed to handle the load. In docking, trailing, and handling a boat, the supports and reels have posed the problem of being in the way of the boatman when not in use in actual fishing.

The supports also have not been entirely satisfactory in use because they encumber the rails and aft deck of the boats; are difficult to mount the reels upon, and remove therefrom; and do not provide easy movement and adjustment of the reels relative to the supports.

SUMMARY OF THE INVENTION

The mounting support is attached to the boat and includes a horizontal bar spaced above the deck of the boat. The bar itself provides a horizontal axis. The bar preferably is also pivotally mounted about a vertical axis. Thus when a reel assembly is pivotally attached to the horizontal bar, it can swing in vertical arcs about the rod and also can swing in horizontal arcs about the pivotal attachment.

The mounting support is preferably shaped like a small capstan so that when the power reel assembly is not mounted thereon, the support is useable as a cleat or block to secure dock and tow lines thereto. The support thus serves a dual purpose and eliminates the need for encumbering reel assembly supports in addition to cleats and blocks.

A head is pivotally mounted on the support about a vertical axis. The horizontal rod is mounted in the head and extends on either side of the head. The rod is preferably two-piece with one piece screwed into either side of the head so as to be easily removable to mount and dismount a reel assembly. The support has a base abutting the boat and is bolted to the deck. A socket or a series of sockets are formed in the base for securing a tang on the reel assembly.

The reel assembly has an L-shaped bracket with a short leg constituting a brace and a long leg constituting the pole portion. A pair of stirrups are attached to the short leg brace near the long leg pole. The stirrups pivotally engage the horizontal rod on either side of the support. A tang extends from the bottom of the short leg brace and is received in the socket of the base. The pole is thus cantilevered on the support via the brace, stirrups, and rod, and is held against movement in a horizontal arc by the tang and against movement in a downward vertical arc by the abutment of the brace against the base of the support.

However, the bracket is easily swung in an upward vertical arc by pivoting the stirrups on the rod so that the pole portion is easily and quickly movable between inboard and outboard positions. In the outboard position the weight of the pole is supported by the brace abutting the base with the tang in the socket and this also secures against horizontal swinging.

To change the horizontal angle of the pole, the user lifts the end of the pole upwardly and this removes the tang from the socket. The assembly is then pivoted horizontally and can be adjusted to the desired angle at which the pole is allowed to swing downwardly and this inserts the tang in the socket at the new position.

The head on the support may be pivotally mounted about a bolt and have a set screw for locking it at a desired position. The head may also integrally include the bar as extending arms so as to be removable with the reel assembly and mountable with the reel assembly.

A reel is rockably mounted on an axle on the pole portion and has a driven wheel which moves with it. A motor is mounted near the reel and has a driving wheel in engagement with the driven wheel in one rocking direction which is augmented by pull on the line extending from the reel. A brake shoe is mounted on the pole adjacent the reel in the opposite rocking direction. Thus a user may disengage the wheels by rocking the reel towards the brake shoe to allow free-fall of the weights and may brake the free-fall by pressing the reel against the brake shoe.

These and other novel features of the invention will become apparent by reference to the following detailed description of the illustrated preferred embodiments of the invention taken in connection with the accompanying drawings.

DESCRIPTION OF THE DRAWINGS

FIG. 1 is a left rear oblique view of the support secured to the rail of a boat, with the boat broken away, showing the support, head, rod and stirrups supporting the reel assembly on the L-shaped bracket.

FIG. 2 is a top plan view of the apparatus seen in FIG. 1, with the boat portion deleted.

FIG. 3 is an enlarged cross-sectional view of the support taken on the line 3—3 of FIG. 2, showing the pivotally mounted head, set screw, and sockets at the base.

FIG. 4 is a cross-sectional view of a modified support with the entire outer portion pivotally mounted on the internal base and pin portion.

FIG. 5 is an enlarged side-elevational view of the apparatus seen in FIG. 2 showing a portion of a boat broken away and the support bolted to the boat portion.

FIG. 6 is a cross-sectional detail view, with parts broken away, taken on the line 6—6 of FIG. 5, showing the brake shoe and brake drum of the reel in disengaged condition.

FIG. 7 is a diagrammatic side elevational view of the reel, driven wheel, driving wheel, brake drum, and brake shoe indicating in solid lines the application of braking and disengagement of drive and indicating in broken lines the application of drive and disengagement of braking.

FIG. 8 is an end elevational view of the line pulley and protective rollers on the end of the pole portion taken in the direction of the arrow 8 of FIG. 5.

FIG. 9 is a top perspective exploded view of a modified support showing the pivotal head embodying the horizontal bar, a stirrup for engaging the bar, and sockets at the base for receiving the tang in the brace.

FIG. 10 is a partial side elevational view of the support and L-shaped bracket with the tang on the bracket engaging a socket formed in a deck mounting plate separate from the support, and showing an eye-bolt stirrup, with parts broken away.

FIG. 11 is a side-elevational view of a strap-iron stirrup bolted on the L-shaped bracket and engaging the horizontal rod with the rod shown in cross-section and the bracket broken away.

FIG. 12 is a side-elevational view of the spool of the reel assembly showing the contour of the hub for level-wind and the spool brake drums in broken lines; and FIG. 13 is a partial showing of the bracket in top plan view showing a pivotal mounting bar for the reel assembly and set screws for adjustably locating the spool for level winding.

DESCRIPTION OF THE PREFERRED EMBODIMENT

Referring now to the drawings wherein like reference numerals refer to like and corresponding parts throughout the several views, the power fishing reel assembly and adjustable, multi-purpose mounting support shown therein to illustrate the invention comprises, FIGS. 1–5, a support block 20. A base 21 on the block 20 abuts the deck 22 of a boat. A head 23 is rotatably mounted on the block 20 on a bolt 24. A set-screw 25 locks the head 23 against rotation. A horizontal rod 26, and a horizontal rod 27 diametrically extend from the head 23 on either side thereof. Sockets 28 are formed in the base 21. The base 21 is secured to the deck 22 by bolts 29. A head 23a may be formed integrally with rods 26a and 27a, FIG. 9; a bolt 24a rotatably mounts the head 23a on the support block 20a. A stationary annular head 23b surmounts the support block 20a and abuts the rotatable head 23a.

An L-shaped bracket 30, FIGS. 1–5, has a long leg or pole 31 portion and a short leg or brace 32 portion. A pair of eye-bolt stirrups 33, 34 extend from the top of the brace 32 and have loops pivotally engaging the rods 27 and 26 respectively. A tang 35 extends from the bottom of the brace 32 and lies in a socket 28 of the base 21. A stirrup 36 may be formed by a U-shaped strap-iron piece, FIG. 11. A bolt 37 secures stirrups 36 to the brace 32. Paired bolts 38 and 39 rotatably cage the horizontal rod 26a.

In FIG. 4, the base 21B has an attached pivot pin 24B on which the head 23B turns. Rods 26 and 27 are screwed in the head 23B. The base 21B has sockets 28 and the head 23B has apertures 28B leading to the sockets. The tang 35 sits in both the aperture 28B and a socket 28. This prevents the head 23B rotating on the pin 24B.

Paired arms 50 and 51 rise above the pole 31, FIGS. 1–5. Each arm 50, 51 has a bottom end pivotally connected at 52 to the pole 31 and a top end 53. A handle 54 interconnects the top ends 53 of the arms 50 and 51. A bearing aperture is formed in each arm 50, 51 intermediate its ends 52, 53. An axle 55 is rotatably bearinged in said apertures. An end 56 of the axle 55 projects beyond one arm 51. A driven wheel 57 is mounted on the end 56. A reel 58 is mounted on the axle 55 intermediate the arms 50–51. A brake shoe 60 is mounted on a projection 61 of the pole 31 for engagement with the drum 59. Brake drums 59 and shoes 60 are paired on both sides of the reel 58, FIGS. 2, 5, 6, 7, and 12. A motor 62 is secured to the pole 31 by U-bolts 63. A drive wheel 64 is mounted on the motor 62 for engaging and driving the driven wheel 57. The spool hub 91, FIG. 12, has a radially high central portion and radially lower end portions. This causes the line to wind levelly on the hub 91 under load.

A sheave 70 is attached to the outer end of the pole 31. A line 71 from the reel 58 leads over the sheave 70 and supports the weight 72. Two rollers 80 and 81 lie below the sheave 70, FIGS. 5 and 8. The rollers 80 and 81 guide the line 71 to the sheave on either side of the boat. One roller guides the line 71 when the assemby is mounted on one side of a boat and the other roller does the guiding when the assembly is mounted on the other side of the boat. A truss rod 73 leads from the outer end of the pole 31 to the bottom of the brace 32. The end of the truss rod 73 may extend through the brace 32 and form the tang 35. A separate deck plate 75 may be screwed to the deck 22 and have an upstanding flange 76. A socket 28 aperture is formed in the flange 76 and receives the tang 35 on the brace 32.

In use, the support block 20 is bolted to the deck 22 by the bolts 29, FIGS. 5 and 10. Preferably several support blocks 20 are mounted on the port and starboard rails and on the sides and center of the off deck above the transom. Thus multiple reel assemblies may be set up on the boat for fishing and/or provide mountings at various selected positions depending on current and wind directions. Each support block 20 preferably includes the horizontal bars 26 and 27 so as to be useable as a cleat or bit for lines. The support block 20 also is useable as a post for bow, stern and tow lines.

To mount the reel assembly on the support 20, the boatman removes one rod 26, 27, and slides one of the stirrups 33, 34 over the other rod 26, 27. He then re-inserts the rod 26, 27 which he had removed in the other stirrup 33, 34 and screws it into the head 23. He locates the tang 35 in a socket 28 and the reel assembly is completely mounted.

Assuming that the pole 31 is extending inboard, the boatman attaches the weight 72 to the line 71. He also attaches the automatic fish-line release and the fish-line and lure, not shown. He then lifts the end of the pole upwardly and this pivots the L-shaped bracket 30 via the stirrups 33, 34 on the rods 26, 27 which swings the brace 32 away from the base 21 so that the tang 35 is removed from the socket 28. The reel assembly and bracket 30 may now be rotated with the head 23 about the bolt 24 from the inboard position to a position outboard of the boat.

The boatman then releases the metal sinker line 71 by pulling back on the handle 54 to disengage the wheels 57 and 64 freeing the reel 58 to let the line 71 run out. The boatman may pull the handle 54 farther back and engage the brake drum 57 on the reel 58 with the brake shoe 60 on the pole 31 to control speed of line 71 outrun.

When a fish strikes the lure, the fish line is detached from the metal line 71 and weight 72. Thereupon the user switches on the motor 62 and the reel 58 is driven to wind in the line 71 and weight 72. Upon the weight 72 arriving at the end of the pole 31 adjacent the sheave 70, the boatman lifts the pole 31 upwardly and swings it on the stirrups 33, 34 and rod 26, 27, over the top of the support block 20, until it is upside down and inboard of the boat with the weight 72 inboard. This places the reel assembly and bracket 30 in a non-interfering position relative to the fish-line and the fisherman playing the fish.

The adjusting screws 85 and 86, FIGS. 2 and 5, bear against the arms 50 and 51. The screws 85, 86 are adjusted so that the arms 50, 51 can swing the driven wheel 57 into engagement with the drive wheel 64 to drive the spool 58 under normal conditions. However, under the load of a snagged line or a very large fish, the wheels 57, 64 can slip to prevent breaking the line. This also prevents overload on the bearings of the motor 62 at the drive wheel 64. A spring 90 urges the arms 50 to swing forwardly to maintain the wheels 57, 64 engaged at all times.

A level-wind adjustment, FIG. 13, comprises a cross-bar 100 lying across the pole 31 near the brace 32. A bolt 101 pivotally connects the cross-bar 100 to the pole 31. Two set screws 102, 103 are threaded in the brace 32 and bear against the cross-bar 100 on opposite sides of the pivot bolt 101. The arms 50 and 51 are connected to the cross-bar 100. As previously described, the arms 50, 51 support the reel 58. By adjusting the angle of the cross-bar 100 by means of the set screws 102, 103, the angle of the reel 58 is adjusted relative to the line 71 so that it is properly positioned at right angles to the axis between the sheave 70 and the high central portion of the spool hub. The line 71 when so adjusted winds levelly on the reel 58.

While twin horizontal rods have been shown and described on a single support block, it is apparent that a single rod, such as 26A, can be mounted between twin blocks, FIG. 11. The socket 28 may be formed in a deck piece 75, 76, separate from the main support block 20, FIG. 10. The head 23a and rods 26, 27, may be formed integral, FIG. 9. The head 23 may be fixed but is preferably rotatably mounted. Reinforcements may be added at various points as desired such as at the connection of the stirrups 33, 34 to the brace 32 where the strain is the greatest. Also the pole may be structurally shaped and/or flanged as desired and the truss 73 is optional. Other modifications and changes may be made as desired within the scope of the invention as defined by the appended claims.

I claim:

1. Easily adjustable, multi-position, deep-water, power fishing-reel apparatus comprising,
   an L-shaped bracket having a downwardly extending short back leg portion constituting a brace and an outwardly extending long front leg portion constituting a pole;
   a tang on said brace remote from said pole, said tang projecting from said brace in a direction opposite to the projection of said pole;
   a support mountable on a boat; a base on said support for abutting a boat; and an upstanding top portion on said support;
   a transverse generally horizontal bar on said upstanding top portion of said support so as to lie spaced above a boat when said support is mounted on a boat;
   said support having at least one socket aperture adjacent its said base lying spaced downwardly from said transverse bar and adapted to receive said tang on said brace;
   paired stirrups extending from said bracket at a point adjacent the juncture of said brace with said pole; said stirrups extending in a direction opposite to said pole; said stirrups pivotally engaging said transverse bar so as to be swingably supported on said bar about the horizontal axis of said bar;
   said bracket being swingable via said stirrups on said bar over said support from a position with said brace extending downwardly abutting said support with its said tang in said socket aperture and said pole extending in one direction (such as outwardly of a boat) to positions up to 180° opposite (such as inwardly of a boat) by pivoting said bracket and said stirrups on said bar with said pole swinging upwardly and then inwardly so that said brace swings outwardly to disengage said tang and then swings upwardly;
   said stirrups and said tang when engaged in said socket securing said bracket against angular movement relative to said base.

2. In apparatus as set forth in claim 1, a separate abutment mountable on a boat; said socket being formed in said separate abutment.

3. In apparatus as set forth in claim 1, a head pivotally mounted on said support for rotation about a vertical axis;
   said transverse bar being secured to said pivotally mounted head;
   said bracket being angularly horizontally moveable about said support by lifting said pole to swing said brace outwardly to disengage said tang on said brace from said socket in said support and then swinging said bracket with said head.

4. In apparatus as set forth in claim 3, a plurality of sockets on said support; said sockets being spaced angularly of one another;
   said bracket being horizontally angularly moveable via said pivotal head to locate said tang in any angularly spaced socket to position said bracket at desired adjusted horizontal angles.

5. In apparatus as set forth in claim 3, a set screw on said head receivable in said support for locking said head at a desired angular position.

6. In apparatus as set forth in claim 1, means forming paired aligned pivot apertures on said pole spaced from said brace;
   paired arms each having a bottom end pivotally mounted at one said aperture and an upwardly extending top end,
   a cross-bar handle lying between said top ends of said arms;
   said arms having aligned bearing apertures between said top and bottom ends,
   an axle lyng in said bearing apertures of said arms,
   a reel fixed on said axle between said arms;
   said axle having an end extending outwardly of one said arm,
   a large driven wheel on said end of said axle,
   a motor mounted on said pole,
   a small drive wheel on said motor engaging said driven wheel on said axle;
   said drive wheel lying on the line extension side of said reel,
   pull on a line extending from said reel urging said wheels into mutual engagement;
   manual pull on said handle swinging said arms to move said driven wheel out of engagement with said drive wheel.

7. In apparatus as set forth in claim 6, said reel having an annular portion constituting a brake drum;
   a brake shoe mounted on said pole adjacent said drum of said reel;
   said shoe engaging said drum to brake said reel with pull on said handle moving said drum into friction engagement with said shoe.

8. In apparatus as set forth in claim 6,
   a cross-bar lying below said arms;

a bolt on said pole pivotally mounting said cross-bar on said pole at a point adjacent said brace;
said arms being pivotally mounted on said cross-bar at said bottom ends of said arms;
set-screws in said brace abutting said cross-bar on either side of said pivot bolt;
adjusting the angle of said cross-bar to said pole by means of said set-screws controlling the angle of said reel to set said reel at the proper angle to wind line levelly on said reel.

9. In apparatus as set forth in claim 8, said reel having a hub portion; said hub portion having a radially high central portion, radially low side portions, and a periphery tapering between said portions.

10. In apparatus as set forth in claim 6, a sheave on the end of said pole portion for leading the line to and from said reel; and at least one protective roller mounted on said pole at said sheave with the side of said roller lying adjacent the center line of said sheave for guiding line to and from said sheave.

* * * * *